(Model.)
4 Sheets—Sheet 2.
A. J. RICE.
APPLE PARER AND CORER.
No. 243,725.
Patented July 5, 1881.
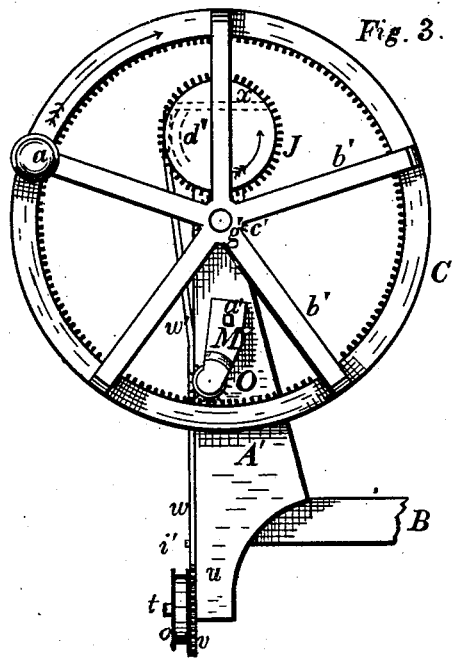
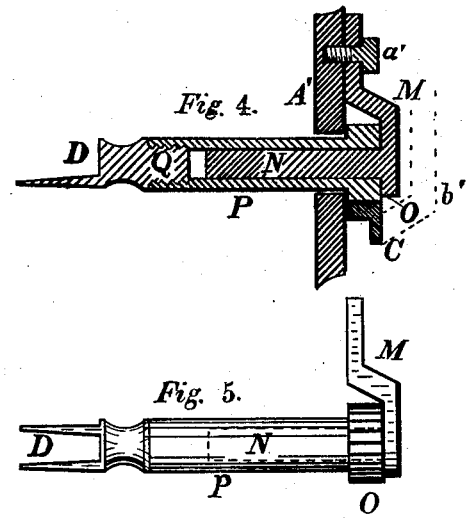
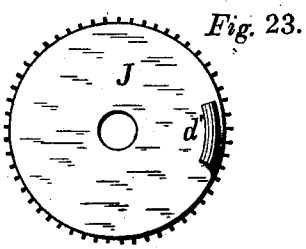
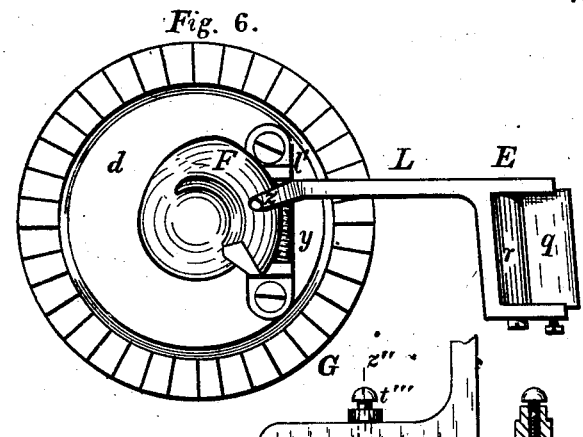
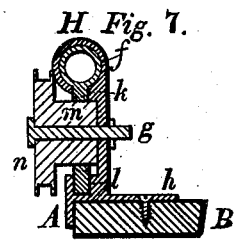
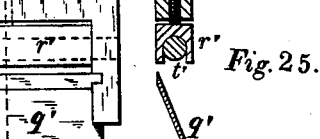
WITNESSES:
H. J. Phillips.
Wm. M. Rebasz Jr.
INVENTOR
Albert J. Rice,
BY G. B. Selden,
ATTORNEY (Model.) 4 Sheets—Sheet 3.
A. J. RICE.
APPLE PARER AND CORER.
No. 243,725. Patented July 5, 1881.
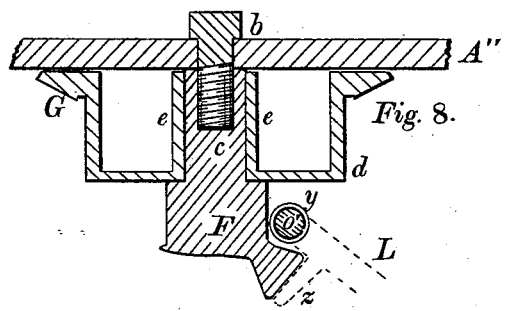
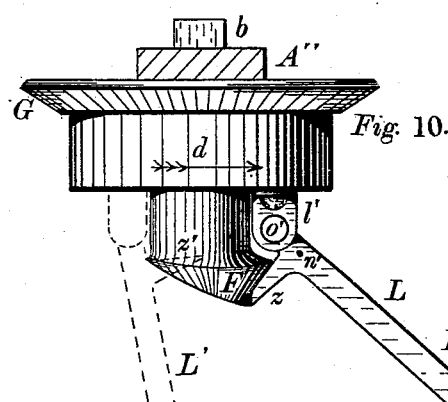
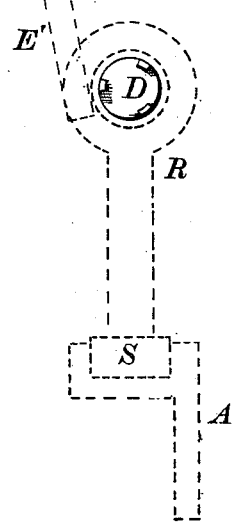
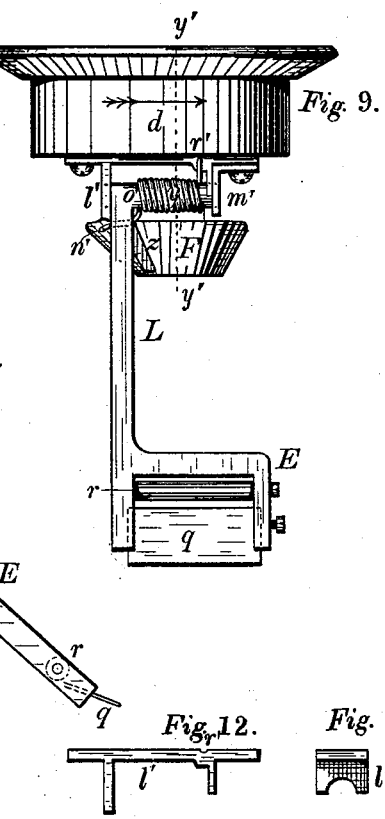
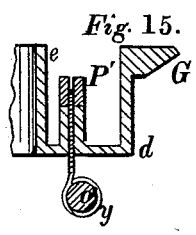
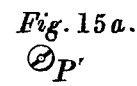
WITNESSES:
H. G. Phillips.
Wm M. Rebasz, Jr.
INVENTOR
Albert J. Rice,
BY Geo. B. Selden,
ATTORNEY:
N. PETERS, Photo-Lithographer, Washington, D. C.

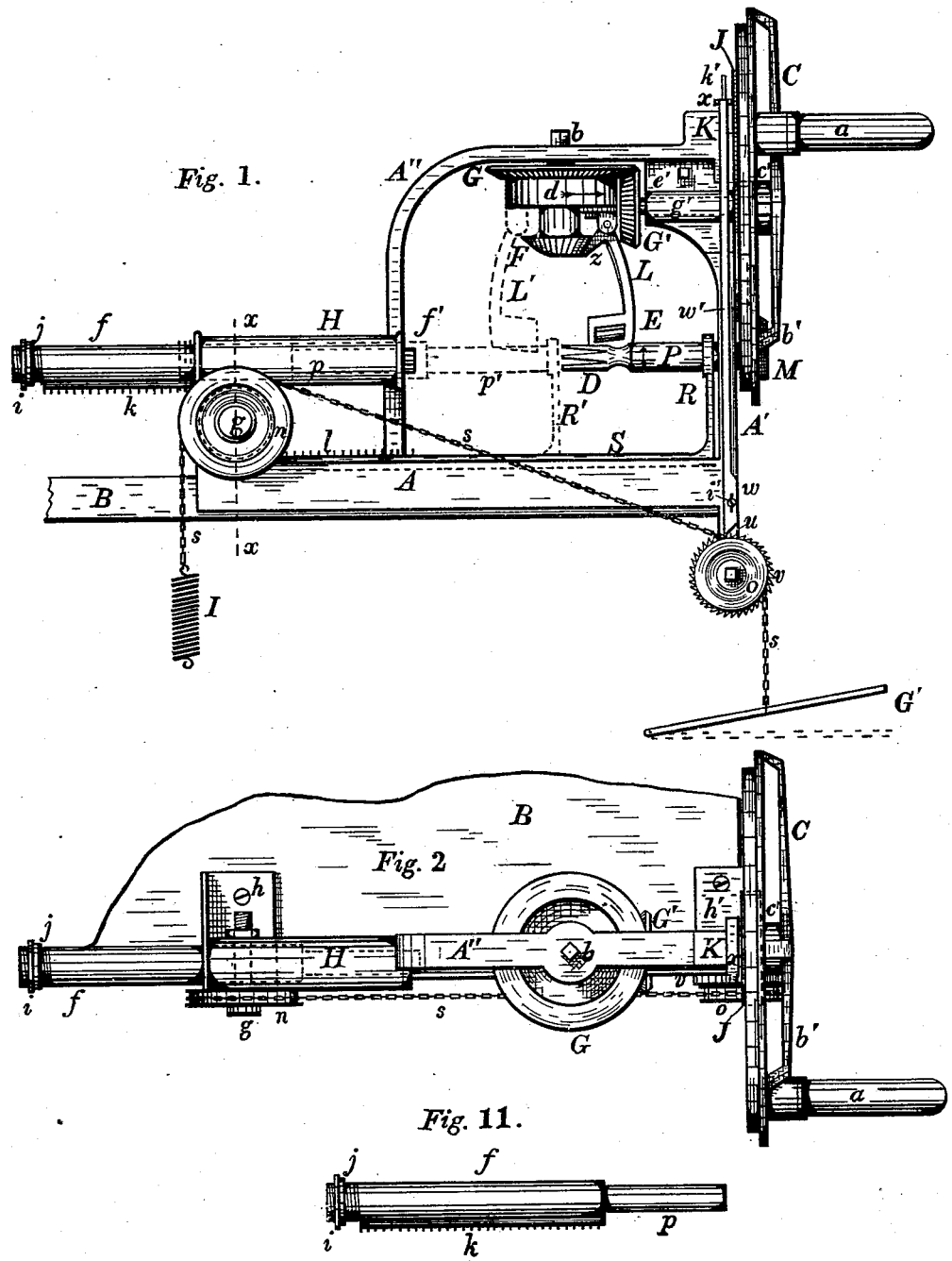

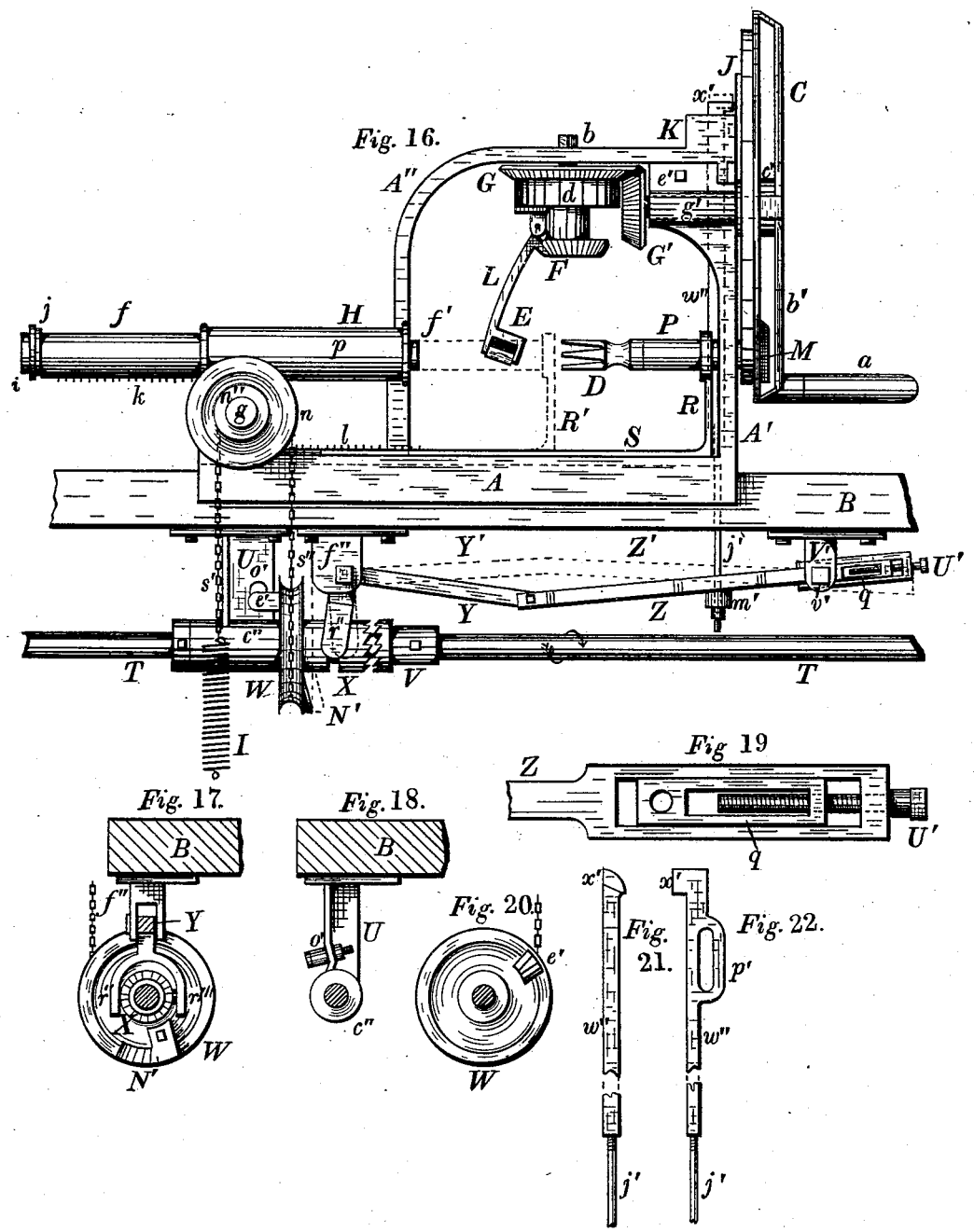

UNITED STATES PATENT OFFICE.

ALBERT J. RICE, OF SODUS, NEW YORK.

APPLE PARER AND CORER.

SPECIFICATION forming part of Letters Patent No. 243,725, dated July 5, 1881.

Application filed March 23, 1881. (Model.)

*To all whom it may concern:*

Be it known that I, ALBERT J. RICE, of Sodus, in the county of Wayne and State of New York, have invented an Improved Apple-Parer, of which the following is a specification, reference being had to the annexed drawings.

My invention relates to an improved combined machine for paring and coring apples; and it consists in certain improvements in the construction of the paring mechanism, and in the combination therewith of a coring device, and in the arrangement of parts whereby the corer is operated either by hand, foot, or power in conjunction with the parts which effect the paring; and it also consists in the mechanical details of the apparatus, as hereinafter more fully set forth.

My improved apple parer and corer is represented in the accompanying drawings, in which—

Figure 1 is a side elevation. Fig. 2 is a plan view. Fig. 3 is an end elevation. Fig. 4 is a vertical section through the fork and spindle. Fig. 5 is a side elevation of the same detached. Fig. 6 is a view of the cam and knife-arm as seen from below. Fig. 7 is a section on the line $x\ x$, Fig. 1. Fig. 8 is a section on the line $y'\ y'$, Fig. 9. Fig. 9 is a side view of the knife-arm, cam, and gear. Fig. 10 is a side view of the same as seen in a direction parallel with the axis of the fork. Fig. 11 is a side view of the reciprocating corer and its slide and rack. Fig. 12 is a side view of one of the lugs by which the knife-arm is secured to the turn-table. Figs. 13 and 14 are end views of the lugs. Fig. 15 is a partial sectional view through the turn-table, showing the means of regulating the tension of the spring which operates the knife-head. Fig. 15$^a$ represents the slotted nut by which the tension is regulated. Fig. 16 represents the arrangement of the machine when the corer is operated by power. Fig. 17 is an end view of the clutch and sprocket-wheel. Fig. 18 represents the bracket which supports the driving-shaft. Fig. 19 represents the sliding block in the end of the shifting-lever. Fig. 20 represents the sprocket-wheel, as seen from the left hand in Fig. 16. Figs. 21 and 22 are side views of the shifting-rod. Fig. 23 is a side elevation of the cam and gear by which the action of the corer is timed. Fig. 24 is a side view of a modification of the knife-head. Fig. 25 is a vertical section on the line $z''\ z''$, Fig. 24.

In the accompanying drawings, A A' A'' represent the frame of my improved apple-parer, which is secured to the edge of a table, B, or other support by means of screws passing through the lugs $h\ h'$, Fig. 2.

C is a gear-wheel, provided with a handle, $a$, by which the fork D and knife-head E are operated.

R is a sliding doffer by which the apple is forced off from the fork after the paring operation, and $p$ is the reciprocating corer-tube.

G' is a treadle by which the corer and doffer are operated by means of the chain $s$.

The frame of my improved apple parer and corer consists of a horizontal bar, A, (which may be provided with a flange projecting over the edge of the table, as shown in Fig. 7,) provided on its upper side with a groove, in which the rack $l$, connection S, and doffer R slide, an upright portion, A', which carries the gear-wheel C and the fork D, and a bent arm, A'', which supports the knife-operating mechanism, consisting of the cam F, gear G, and revolving turn-table $d$, and which is attached at its lower end to the sleeve H, in which the corer slides. The sleeve H is attached to the horizontal portion of the frame A by suitable upright bars. For convenience and cheapness of construction I prefer to cast the frame in one piece, but it may be made in any other preferred way.

The gear-wheel C is fastened to the outer end of the shaft $g'$, Figs. 1 and 3, which revolves in a bearing on the upper part of the frame A' formed by the removable box $e'$, Fig. 1. At its inner end the shaft $g'$ carries the bevel-gear G', by which the knife is operated.

At the outer end of the shaft $g'$, inside the offset-arms of the gear-wheel C, is fastened the pinion $c'$, Figs. 1, 2, and 3, meshing with the gear J, from a cam, $d'$, on the inside of which the sliding catch $w$ is operated, by which the movements of the corer and doffer are timed with reference to the position of the knife. The pinion $c'$ may be cast in one piece with the gear-wheel C. The gear C is provided with internal teeth, which mesh with the pinion O on the fork-shaft P.

The mode of attaching the fork and fork-shaft to the frame A' are shown in Figs. 4 and 5. The fork-shaft is hollow, and revolves on a spindle, N, which is supported by an arm, M, offset around the pinion O and bolted to the frame at a', Figs. 3 and 4.

The fork D, which may be of any ordinary form, is provided with a threaded hub, Q, Fig. 4, which screws into the inner end of the fork-shaft P in such fashion as to leave an oil-recess between it and the end of the shaft. The bearing is oiled by removing the fork D from the shaft by unscrewing it. The recess may be filled with cotton-waste or other oil-absorbing material, thus forming a self-lubricating bearing inside the fork-shaft which will run for a long time without renewal of the oil. The fork-shaft passes through an opening in the frame A'.

The arms b' of the gear-wheel C are offset, so as to pass outside of the pinion O and the bent arm M, as represented in Fig. 4.

The knife-head E is provided with a suitable paring-blade, q, and guide-roller r, Figs. 6, 9, and 10. It is attached to the lower end of the arm L, which may be straight or curved, and which is provided at its upper end with a short cross-shaft, o', Figs. 8, 9, and 10, which turns freely in openings in the lugs l' and m', by which it is secured to the revolving turn-table d. The arm L is also provided with a projecting arm, z, which bears against the outer face of the stationary cam F. A spring, y, Figs. 8 and 9, is coiled about the shaft o', one end thereof being passed through the arm L at n', and the other end secured in a notch in the upper side of the plate which carries the lug l'. (See Fig. 12.) The lug l' may be cast on the turn-table, the lug m' being attached thereto by screws, and the end of the spring being caught between it and the turn-table.

The cam F is provided with a shank, c, which projects upward through the center of the revolving turn-table d, and is secured to the lower side of the frame A'' by the bolt b, Fig. 8. A shoulder on the shank c supports the turn-table d and bevel-gear G, which may be cast together, the turn-table being made hollow for the sake of lightness. The turn-table is made of sufficient depth to permit the revolution of the knife-arm without coming in contact with the bevel-gear G'. The cam F is so shaped and placed relatively to the fork that during the revolution of the turn-table carrying the knife, the latter will, during one half of its revolution, be forced toward the fork by the spring y, as represented at E', Fig. 10, while, during the other half of the revolution, the knife will be held away from the fork, as shown in full lines, Fig. 10, by the arm z coming in contact with the cam. The paring operation takes place while the knife is on the opposite side of the fork from the observer, or beyond the fork, as seen in Fig. 1. The coring is performed while the knife is traveling through that part of its path nearest the observer in Fig. 1. The cam F is cone-shaped on its outer surface, being cut away on one side to allow the spring y to swing the knife-head toward the apple on the fork. It throws the knife-head away from the fork during about one-half of the revolution of the turn-table, permitting the knife-head to approach the apple immediately after it has passed over the fork.

The coring-tube p and its slide f are arranged to reciprocate freely in the sleeve H to and from the fork D. The motion toward the fork is produced by the pressure of the operator's foot on the treadle G', which, by means of the chain s, sprocket-wheel n, and pinion m, Fig. 7, meshing with the rack k, attached to the corer-slide f, forces the coring-tube up to the fork, the return motion being obtained by the spring I, the lower end of which is attached to the floor or other convenient stationary object. The sprocket-wheel n and gear m may be cast together, and they revolve on a stud, g, Fig. 7, passing through an arm of the frame, extending upward from the lower part thereof, A, to the sleeve H. At its outer end the corer-tube slide f is provided with a thread and nut, i, by which its inward motion is arrested, the nut i striking against the outer end of the sleeve H. To prevent shock when the motion of the corer-tube is arrested, the rubber washer j, Figs. 1, 2, and 11, may be placed on the slide f, inside the nut i. A slot is made in the lower side of the sleeve H for the purpose of allowing the rack k to slide backward and forward therein. At the same time that the coring-tube is forced toward the fork the doffer R, which consists of an upright bar terminating in a yoke or ring which surrounds the fork, is caused to slide toward the corer by the connection S, provided with a rack, l, meshing with the pinion m. The position of the corer and doffer at the end of their forward movements is represented by the dotted lines p' and R' in Fig. 1. The spring I, which returns the corer, also returns the doffer to its original position. The connection S and rack l slide in a groove in the upper side of the lower part of the frame A. (See Fig. 7.)

The operation of the corer and doffer is timed from the gear-wheel C in the following manner: The chain s runs over a sprocket-wheel, o, revolving on a stud inserted in the downwardly-projecting arm u, Fig. 3, of the frame. Attached to the sprocket-wheel o is a ratchet-wheel, v, whose motion is controlled by the sliding catch w, secured to the arm u by a screw, i', passing through a slot therein. A rod, w', extending upward from the catch w terminates in an arm projecting across the face of the gear J, which is revolved by the pinion c', attached to the shaft of the gear-wheel C, on a stud inserted in the lug K. The catch w is ordinarily held down by its own weight, its point engaging with the teeth of the ratchet v, and thereby preventing motion of the sprocket-wheel o and the depression of the treadle G' except when the cam d' on the side of the gear J, coming in contact with the arm $x$, raises the catch and permits the downward motion of the treadle, by which the corer and doffer are operated. The gearing of the machine is so proportioned that the cam $d'$, Fig. 23, raises the catch $w$ when the knife E has completed the pairing operation and been raised out of the way by the action of the cam F on the arm $z$.

In the practical operation of my improved apple parer and corer the operator sitting or standing in front of the machine, with one foot on the treadle $G'$, the parts being in the position indicated by the full lines in Fig. 1, places an apple on the fork with his left hand, and, turning the crank $a$ with the right hand, causes the knife E to traverse over and pare the surface of the revolving apple, and to swing out of the way between the operator and the fork, at which time the cam $d'$ raises the catch $w$, and allows the descent of the treadle $G'$. The coring-tube $p$ now comes forward toward the fork, entering the apple, which is at the same time forced off from the fork, thereby completing the coring operation by the movement of the doffer from right to left in Fig. 1. Immediately after the descent of the treadle the operator removes his foot therefrom, thereby permitting the spring I to return the corer and doffer to their original positions, the pared and cored apple being forced off the coring-tube as it returns by coming in contact with the inner end of the sleeve H, when the machine is ready for a repetition of the operations on another apple. The cores are forced through the hollow coring-tube and its slide, and discharged at the left-hand end of the machine.

So simple and easy is the manipulation of my machine, after a little practice, that as many as twenty-five or thirty apples may be pared and cored in sixty seconds, which amounts to ten or more bushels per hour.

It is obvious that a weight might be substituted for the spring I.

My improved machine may be used as a parer alone, the coring attachment being removed, and a cam and lever or other suitable device being arranged to push the apple off the fork after it has been pared.

It is obvious also that the movement of the corer and doffer, either simultaneous or successive, may be obtained by other mechanism equivalent to the racks and pinion herein described—as, for instance, by cranks and connecting-rods. A hand-lever may also be substituted for the treadle $G'$.

In Fig. 16 I have represented my improved machine when the corer is arranged to be operated by power. Underneath the table B, upon which may be placed a number of machines, is the shaft T, to which a continuous rotary movement is imparted by any suitable motive power. The shaft is supported from the table by brackets U, carrying boxes $c''$, placed at suitable distances apart. Upon the shaft is fixed the clutch-jaw V, from which the parer and corer are operated by means of the clutch-jaw X, sprocket-wheel W, and chain $s''$, the clutch being so arranged as to be thrown into gear by the cam on the gear J, and to be thrown out of gear automatically when the coring operation is finished. The sprocket-wheel W and clutch-jaw X are free to slide endwise on the shaft T, between the box $c''$ and the clutch-jaw V. The jaws of the clutch are engaged and the sprocket-wheel W caused to revolve with the shaft by means of the yoke $r''$ $r'''$, pivoted to the bracket $f''$, and the shifting-levers Y Z operated from the cam $d'$ on the gear J by means of the slide $w''$ and the rod $j'$. The position of the shifting-levers when the clutch is thrown into gear is represented by the dotted lines $Y'$ $Z'$. The slide $w''$ is provided at its upper end with a lug, $x'$, against which the cam $d'$ strikes, raising the slide and the levers into the position shown by the dotted lines. The slide is fastened to the rear side of the frame $A'$ by a screw passing through the slot $p'$, Fig. 22. The rod $j'$ is screwed into the lower end of the slide $w''$, and passes downward through the table and through a slot in the shifting-lever Z, being provided at its lower end, below the lever, with a pair of jam-nuts, by which its length may be regulated. A rubber cushion, $m'$, may be interposed between the jam-nuts and the lower side of the lever. The outer end of the lever Z is pivoted in the bracket $V'$ on the stud $v'$, a sliding-box, $q$, through an opening in which the stud passes, being introduced into a slot in the end of the lever, so that the length of the lever may be regulated by means of the screw $U'$. The box $q$ is so adjusted that the levers, when in their elevated position, require some little force to depress them, by which arrangement the clutches are held in gear with each other during the coring operation. The sprocket-wheel W communicates its motion to the sprocket-wheel carrying the gear which moves the corer by the chain $s''$. A smaller sprocket-wheel, $n''$, revolving on the stud $g$ with the wheel $n$, receives the chain $s'$, to which the spring I, by which the return motion of the corer is produced, is attached. After the sprocket-wheel W has made a partial revolution, thereby imparting the desired motion to the corer-tube, the incline $N'$ on the side of the wheel comes in contact with the bracket $f''$, by which the wheel is caused to slide to the left on the shaft T, and the jaws of the clutch disengaged. The return motion of sprocket-wheel W, caused by the spring I, is arrested by the arm $e'$ coming in contact with the rubber cushion $o'$ attached to the bracket U. (See Fig. 18.) The weight of the shifting-levers effectually prevents the accidental engagement of the jaws of the clutch. The cam $d'$ is so timed with reference to the paring operation that the knife-head E comes between the operator and the path of the coring-tube, so as to prevent the operator's hand from coming in contact with the coring-tube during its forward movement.

A number of machines arranged on the table may be operated from the shaft T by mechanism similar to that herein described. The labor required to work the machine is materially lessened by the arrangement for moving the corer by power, leaving nothing for the operator to do but to place the apples on the fork and turn the crank a.

It is obvious that a hand-lever for operating the corer or doffer may be substituted for the treadle, with or without a chain and sprocket-wheel.

It is obvious, also, that pulleys n and n'', over which the chains run and to which they are attached, as shown in Fig. 16, may be substituted for the sprocket-wheel shown in Fig. 1.

The slide S, which carries the doffer, may be held in the groove in which it slides by a cap bolted onto the frame.

Cranks and connecting-links may be used in place of the pinion and racks for operating the corer and doffer.

In Figs. 24 and 25 I have represented a modification of the knife-head, in which a stationary block is substituted for the roller shown in Fig. 6. The block or guard $r'$ is provided with a groove, through which the screw $t'$ passes, and against which it is held by the screw $t'''$. The guard is made of the same shape on each side, so that when it becomes worn it may be reversed. The guard is preferably hardened. The knife $q'$ is held in place in the head by the set-screw $t''$, as in the previous case.

I claim—

1. The combination, with the fork D, of the reciprocating coring-tube $p$ and the doffer R, substantially as described.

2. The combination of the fork D, reciprocating corer $p$, doffer R, racks $k$ and $l$, and pinion $m$, substantially as described.

3. The combination of the fork D, reciprocating corer $p$, doffer R, racks $k$ and $l$, pinions $m$, sprocket-wheel $n$, spring I, chain $s$, and treadle G', substantially as described.

4. The combination, with a suitable paring mechanism, of the rotating fork D, reciprocating corer $p$, treadle G', a detent actuated by the paring mechanism to release the treadle, and suitable mechanism to connect the corer and treadle, substantially as described.

5. The combination, with a suitable paring mechanism, of the rotating fork D, reciprocating corer $p$, doffer R, treadle G', and a detent actuated by the paring mechanism to allow the treadle to operate the corer and doffer, substantially as described.

6. The combination of the fork D, hollow sleeve P, spindle N, and offset-lug M, substantially as and for the purposes set forth.

7. The combination, with a suitable supporting-frame, of the fork D, sleeve P, provided with pinion O, spindle N, and lug M, and the internal gear, C, having offset-arms $b'$, substantially as and for the purposes set forth.

8. The combination, with a suitable supporting-frame, of the fork D, sleeve P, provided with pinion O, spindle N, and lug M, the internal gear C, shaft $g'$, bevels G G', and suitable mechanism for actuating the paring-knife, substantially as described.

9. The combination, with the fork D, of the corer $p$, reciprocating within a suitable support, H, and provided at its outer end with an adjusting-screw, $i$, whereby its approach to the fork may be regulated, substantially as and for the purposes set forth.

10. In combination with the cam F, the swinging knife-arm L, attached to its revolving support by the removable lugs $l'$ and $m'$, substantially as and for the purposes set forth.

11. In combination with the knife and knife-head of an apple-paring machine, the reversible guard $r'$, having wearing-surfaces on opposite sides thereof, substantially as and for the purposes set forth.

12. The combination, in the knife-head of an apple-paring machine, of the knife $q'$, reversible guard $r'$, and screws $t'$ $t'''$, substantially as described.

13. The combination, in an apple-parer, of a rotating fork, suitable paring mechanism, a corer arranged to reciprocate in the line of the axis of the fork, and a revolving cam actuated by the paring mechanism and operating to bring into action a suitable corer-moving mechanism, substantially as described.

14. The combination, with the fork D and paring mechanism, of the reciprocating corer $p$, revolving cam $d'$, shaft T, clutch X V, and mechanism for connecting the cam and the clutch, and the clutch with the corer, substantially as described.

ALBERT J. RICE.

Witnesses:
 A. R. SELDEN,
 H. G. PHILLIPS.